United States Patent [19]

Vaishnav

[11] 4,083,672
[45] Apr. 11, 1978

[54] AUTOMATIC HUB AND APPARATUS FOR DISASSEMBLY OF THE HUB

[75] Inventor: Dolar Harshadrai Vaishnav, Cuyahoga Falls, Ohio

[73] Assignee: The Firestone Tire & Rubber Company, Akron, Ohio

[21] Appl. No.: 782,252

[22] Filed: Mar. 28, 1977

[51] Int. Cl.² .......................... B29C 5/00; B29H 3/08; B29F 1/00; B29H 17/00
[52] U.S. Cl. .................................. 425/457; 425/577; 425/35; 249/184
[58] Field of Search ................... 425/28 P, 242 R, 52, 425/457

[56] References Cited
U.S. PATENT DOCUMENTS

| | | | |
|---|---|---|---|
| 2,476,884 | 7/1949 | Maynard | 425/52 X |
| 2,866,500 | 12/1958 | George et al. | 425/28 P X |
| 3,128,807 | 4/1964 | Kilgore | 425/28 P X |
| 3,184,794 | 5/1965 | Sherkin | 425/36 X |
| 3,214,790 | 11/1965 | Wright et al. | 425/28 P X |
| 3,695,808 | 10/1972 | Benege | 425/242 R X |
| 3,924,982 | 12/1975 | Yang et al. | 425/242 R |
| 3,994,650 | 11/1976 | Nishimura | 425/242 R |

*Primary Examiner*—J. Howard Flint, Jr.

[57] ABSTRACT

The present disclosure illustrates a hub assembly for holding core segments which segments as held by the hub assembly are utilized in the centrifugal casting of vehicle tires. The core segments are held in circumferentially extending relationship to each other to form an annularly extending core. The hub assembly is comprised of a hub member and a hub ring that can be quickly and conveniently connected together to hold the core segments and in a like manner can be disassembled to release the core segments so the core segments can be disassembled from their circumferentially extending relationship to each other and removed from a finished tire. The present disclosure also includes an apparatus for automatically, as distinguished from manually, separating and removing the two parts of the hub assembly from the central opening of a centrifugally cast vehicle tire.

10 Claims, 7 Drawing Figures

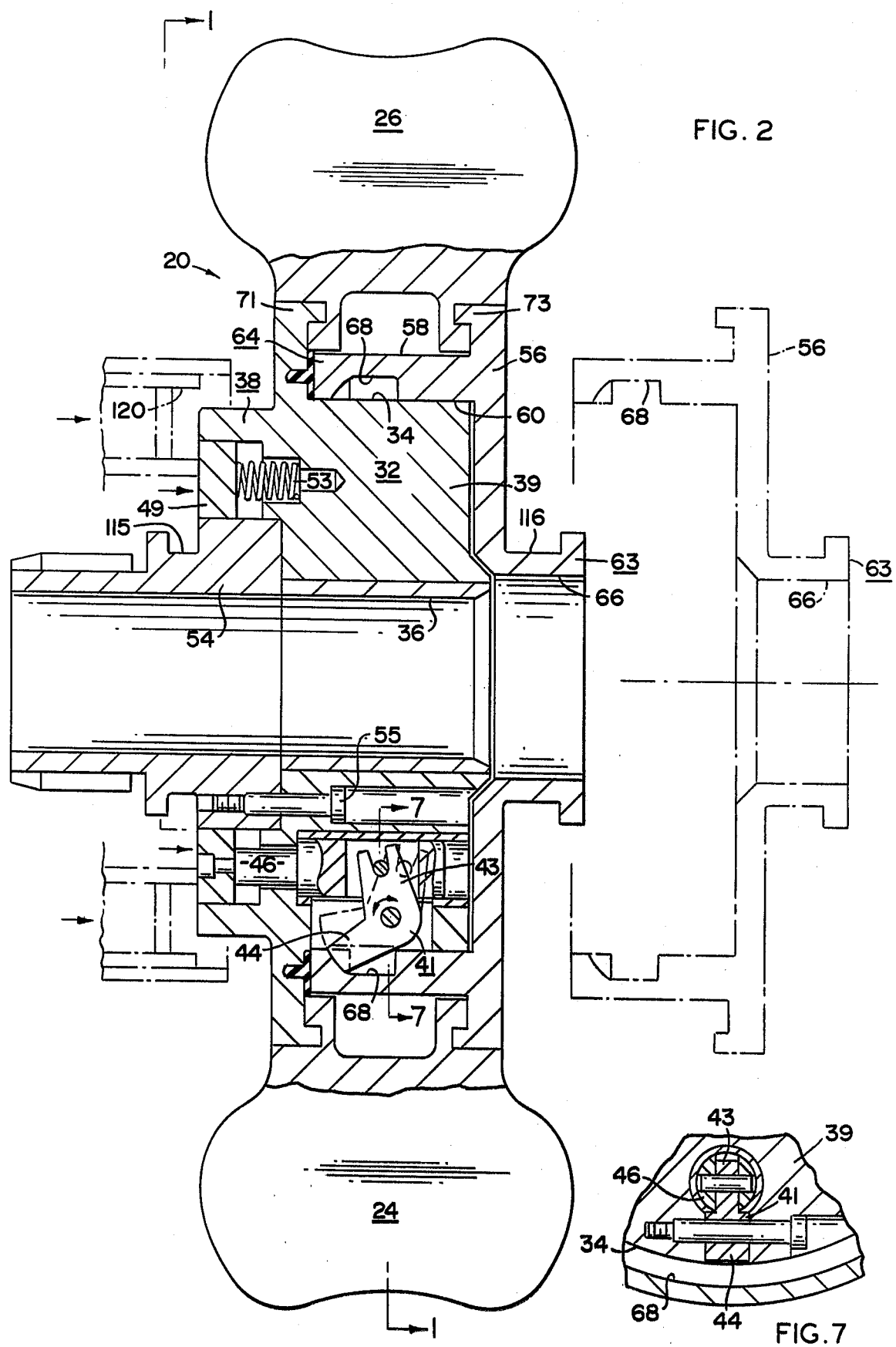

AUTOMATIC HUB AND APPARATUS FOR DISASSEMBLY OF THE HUB

In prior art disclosures relating to the centrifugal casting of vehicle tires it is known to form the mold enclosure which is the contour of the finished vehicle tire by means of core segments secured in place by two central hub halves and an outer tread ring and two opposed sidewall forming mold members. In such prior art apparatus the core segments are held together by means of two hub halves that are clamped together securing the core pieces therebetween and these hub halves are held together by means of screws or other mechanical fastening devices. This prior art means of securing the hub halves together is extremely time consuming and laborious in either assembling the halves together so as to secure the core segments or in disassembling the hub halves in order to remove the core segments after a centrifugal casting operation has been completed forming a vehicle tire.

It is, therefore, a purpose of the present invention to design and disclose an automatic hub to secure the core segments together, which includes two hub halves, that is receptive or conducive to automatic assembly and disassembly operations which result in assembly and disassembly which is considerably faster than with conventional bolted-together type hub designs. The automatic hub of the present invention makes it possible to automate the assembly and disassembly operations of centrifugal casting operations and thus make production faster as well as making the operations safer and less demanding of skill in the operators of the devices.

The present invention also includes an apparatus for automatically disassembling the two hub halves of the automatic hub and also provides for the automatic removal of the hub halves from the central opening of a centrifugally cast tire mold after the centrifugal casting operation is completed.

Other objects and a fuller understanding of this invention may be had by referring to the following description and claims, taken in conjunction with the accompanying drawings, in which:

FIG. 2 is an enlarged sectional view of the automatic hub of the present invention taken generally along the line 2—2 of FIG. 1;

FIG. 7 is a view taken generally along the line 7—7 of FIG. 2.

Figure 1:
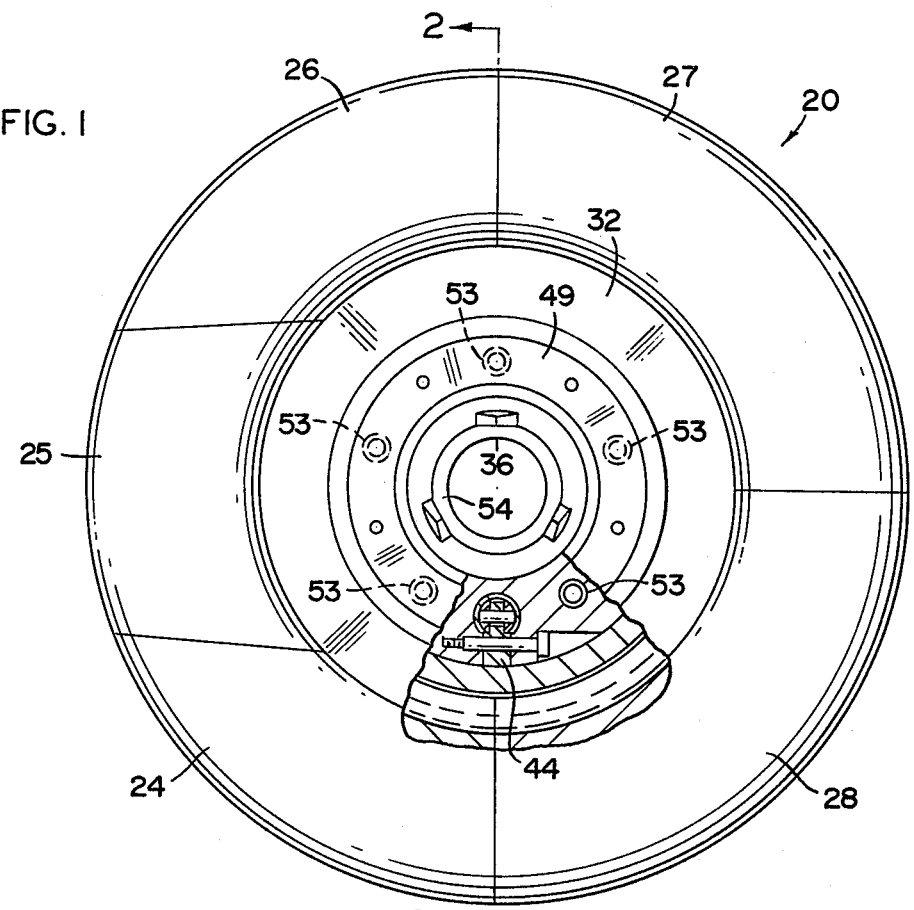
FIG. 1 is an elevational view of the automatic hub of the present invention securing core segments in place and taken generally along the line 1—1 of FIG. 2.
Figure 6:
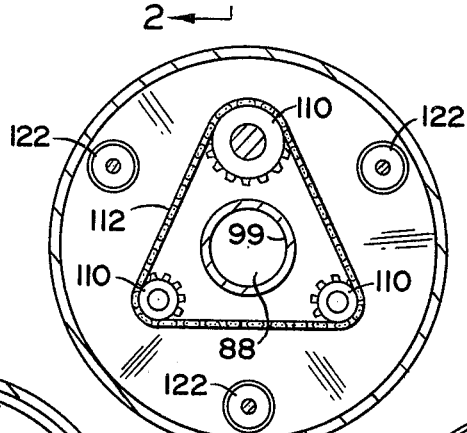
FIG. 6 is a view taken generally along the line 6—6 of FIG. 3.

The hub assembly of the present invention is best illustrated in FIGS. 1 and 2 of the drawings and is indicated generally by the reference numeral 20. The hub assembly 20 is illustrated as securing core segments 24, 25, 26, 27 and 28 in assembled relationship in a condition where the hub assembly and core segments can be moved into a centrifugal casting machine to produce a centrifugally cast vehicle tire.

The hub assembly 20 includes a hub member 32 which comprises an annular member having an outer peripheral surface 34 and a bore defining an inner peripheral surface 36. In the embodiment shown, surface 36 is located on a bushing inserted into a bore in the hub member 32. The hub member has first and second axial end portions 38 and 39 respectively.

A plurality of circumferentially spaced and pivotally mounted latch members 41 are carried by the hub member 32 and each latch member has first 43 and second 44 end portions and each is movable between latched and unlatched positions. The full line position of the latch member 41 in FIG. 2 shows the latched position and the dot-dash line position indicates the unlatched position of the latch member. Only one of the latch members 41 has been shown in each of FIGS. 1 and 2; however, it is to be understood that there are five such latch members located in the hub member and positioned 72° apart. A plurality of circumferentially spaced pin members 46 (five in number) extend into the hub member 32 from the first axial end portion 38 thereof. A first end portion of the pin members 46 is operatively connected to a first end portion 43 of a respective latch member. This operative connective is as illustrated in FIG. 2 and comprises a bifurcated portion on the latch member surrounding a pin which is carried by member 46. The longitudinal movement of pin member 46 causes rotation of latch member about its pivotal mounting between latched and unlatched positions.

A locking ring 49 is carried by and located at the first axial end portion 38 of the hub member 32. A second end portion of the pin members 46 is operatively connected to the locking ring 49 as shown in FIG. 2 and spring means 53 act on the locking ring to at all times urge the locking ring to its first position. In this embodiment the spring means comprises five symmetrically spaced springs as last seen in FIG. 1. The locking ring is movable between its first position in which it is shown in FIG. 2 to a second position which is inwardly to the right as viewed in FIG. 2. This movement of the locking ring between its first and second positions moves the latch members between their latched and unlatched positions. The hub member 32 also includes a hub extension 54 which is secured to the hub member by threaded members 55. The hub extension 54 is also provided with a bore which provides a continuation of the inner peripheral surface 36. The hub extension is useful in utilizing the hub assembly on the hub disassembly apparatus which forms part of the present specification and which will be discussed in greater detail hereinafter.

The other so-called half of the hub assembly is identified as a hub ring 56 which also comprises an annular member having an outer peripheral surface 58 and an inner peripheral surface 60. The hub ring has first and second axial end portions 63 and 64 respectively and is also provided with wall means which define a bore 66 extending through the first exial end portion. The hub ring 56 is provided with a latch receiving recess 68 which extends into the hub ring from the inner peripheral surface 60 thereof and this latch receiving recess is for the purpose of receiving the second end portions 44 of the latch members 41 so as to lock the hub member and ring member together in their assembled position.

A first core engaging flange 71 extends generally radially outwardly from the outer peripheral surface 34 of the hub member and extends completely therearound through 360° and is adapted to engage one side portion of the plurality of assembled core segments or sections 24—28 in a manner best illustrated in FIG. 2. A second core engaging flange 73 extends generally radially outwardly from the outer peripheral surface 58 of the hub ring and is adapted to engage another side portion of the assembled core sections or segments 24—28 in the manner illustrated in FIG. 2.

The hub member and hub ring as illustrated in FIG. 2 are in their assembled condition and in this position the hub ring 56 resides essentially on the hub member with the inner peripheral surface 60 engaging the outer peripheral surface 34 and with the second axial end portion 64 of the hub ring engaging the first core engaging flange 71 which is connected to the hub member 32. Also in this assembled condition the second end portions 44 of the latch members 41 reside in the latch receiving recess 68 to secure the hub ring and hub member together in the position shown in FIG. 2. When the locking ring 49 is moved inwardly to the right, as seen in FIG. 2, against the urging of spring means 53, the latch members 41 are moved about their pivotal mountings removing the second end portions 44 of the latch members from the latch receiving recess and when in this condition the hub ring and hub member may be moved away from each other in an axial direction to separate the two members from each other. The dot-dash position of hub ring 56 in FIG. 2 illustrates movement of the same relative to hub member 32 when these two elements are being assembled and disassembled. When this has been accomplished the assembled core segments 24—28 may be removed from the outer peripheral surface 58 of the hub ring 56. In their normal condition of removal the core segments are still surrounded by a centrifugally cast vehicle tire and the core segments must be removed from the completed tire. This is accomplished at another station of the manufacturing operation not illustrated herein.

The reassembly of the hub member and hub ring of the hub assembly is essentially the reverse of the procedure outlined hereinabove in that the hub member and hub ring are brought together in an axial direction with the core segments assembled and positioned on the outer peripheral surface 58 of hub ring 56. As the two parts are brought together the locking ring 49 is pressed axially inwardly against the force of spring means 53 and this serves to move the latch members 41 to unlatched condition or in other words moves them to the dot-dash line position of FIG. 2 which permits the hub ring to be brought into the position shown in FIG. 2. When these two elements are positioned as shown then the core segments are held together between the flanges 71 and 73 at which time the locking ring is released which moves the second end portions of the latch members radially outwardly to their full line position shown in FIG. 2. This brings the hub ring and hub member to their completely assembled position. At this stage of the procedure, however, and as the locking ring is released it is necessary that a certain amount of external pressure be maintained holding the hub member and hub ring together to assure an adequate clearance between the latch receving recess and the latch members so that the latch members can move freely into the latch receiving recess. The complete and proper engagement of the latch members is indicated by the locking ring moving all the way to its outermost position as illustrated in FIG. 2, flush with the first end portion of the hub member. With this indication the external pressure can be removed from the hub member and hub ring and the assembly operation can be assumed to be complete.

The hub disassembly apparatus is best illustrated in FIGS. 3, 4, 5 and 6 and is indicated generally by the reference numeral 77. The primary function of the hub disassembly apparatus is to disconnect the hub member from the hub ring and remove these two elements from the inner circumferential periphery of a completed tire.

Figure 3:
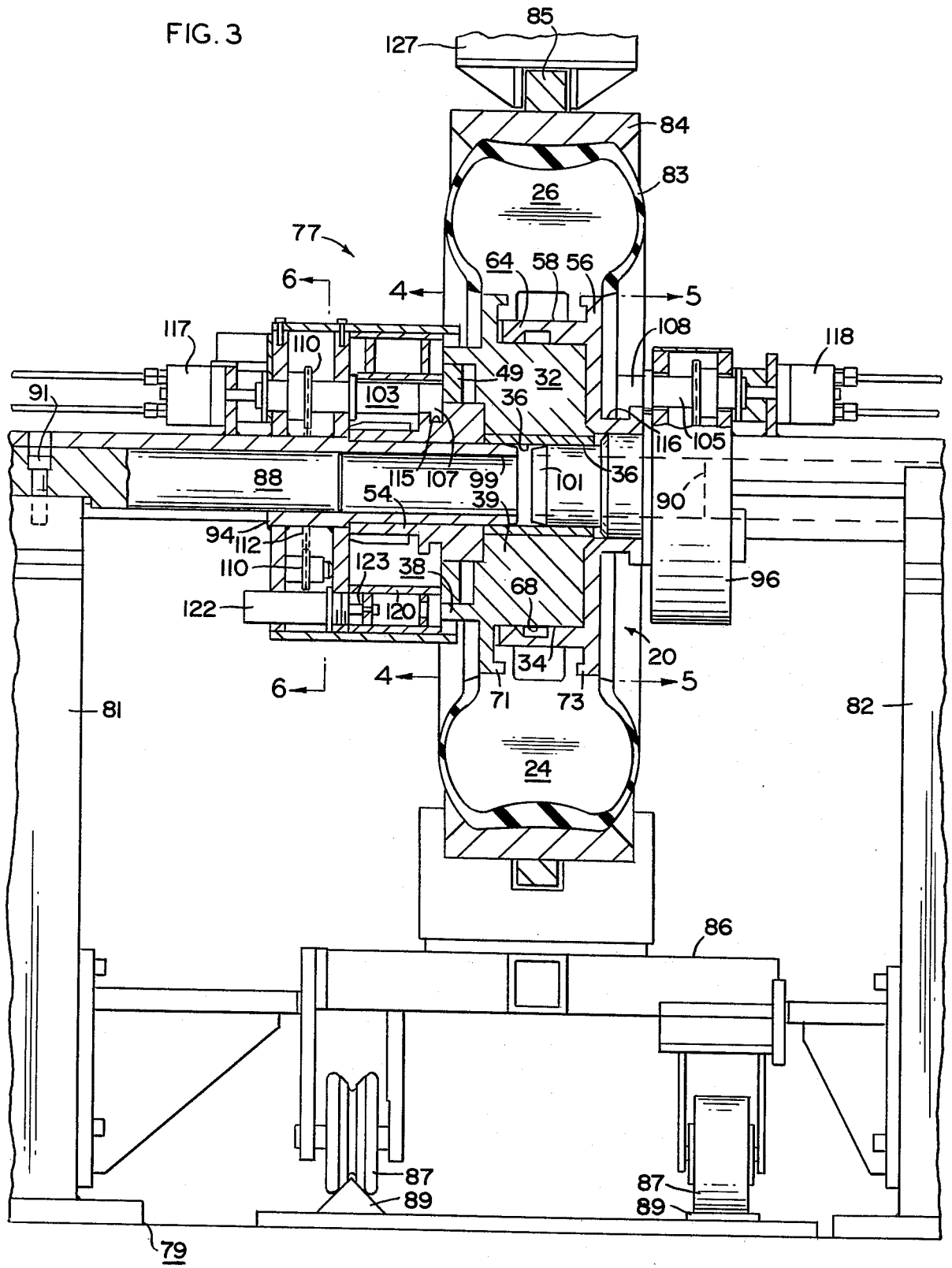
FIG. 3 is a longitudinal sectional view of the apparatus for assembling and disassembling the automatic hub illustrated in FIGS. 1 and 2.

The hub disassembly apparatus 77 includes in combination a base 79 which in turn comprises first and second spaced portions 81 and 82 respectively. In the illustration of FIG. 3 it will be seen that the assembled hub member 32 and hub ring 56 with the secured core segments 24—28 are illustrated as being contained within the confines of a centrifugally cast tire 83 which in turn carries a tread ring 84 about its outer circumferential extent. The tread ring in turn is secured in position by means of ring 85. This entire assembly is moved into the position shown in FIG. 3 between the first and second spaced portions 81 and 82 of the base 79 on a carriage 86 which is mounted on wheels 87 which in turn travel on a track 89.

First and second guide rod members 88 and 90 are mounted respectively on the first and second portions of the base and extend toward each other in axial alignment and terminate short of each other as illustrated in FIG. 3. These guide rod members 88 and 90 are fixedly secured in position by means of threaded members 91, only one of which has been shown. First and second slide carriages 94 and 96 are respectively mounted on the first and second guide rod members 88 and 90 and each of the referred to slide carriages is adapted to move between a retracted inoperative position and a forward operative position. The forward operative positions are those illustrated in FIG. 3.

Each of the first and second slide carriages 94 and 96 have respectively first and second locator shafts 99 and 101 which are adapted to enter the bore 36 in the hub assembly 20 which has been hereinbefore described, and this serves to locate the hub assembly both axially and radially. A first plurality of a pulling fingers 103 are carried by the first slide carriage 94 and a second plurality of pulling fingers 105 are carried by the second slide carriage 96. Each of the pulling fingers, whether on the first carriage 94 or second carriage 96, is mounted for rotative movement. The fingers are mounted in bearings and each has first and second end portions. Fingers 103 have radially extended portions 107 on their first end portions which are adapted to move into and out of a collar 115 on hub member 32 and fingers 105 have similar portions 108 which are adapted to move into and out of another collar 116 on hub ring 56. Rotation of the fingers in one direction causes the radially extended portions to move into collars 115, 116 and rotation in the other direction causes the radially extended portions to move out of collars 115 and 116.

Sprockets 110 are carried by the second end portion of each of the pulling fingers and a first chain 112 connects all fingers 103 on the first slide carriage together and a second chain 113 over the sprockets of fingers 105 rotatively connects all fingers 105 on the second slide carriage 96 together. A rotary actuator 117 is connected to one of the fingers 103 and a rotary actuator 118 is connected to one of the fingers 105 on slide carriage 96. Rotation of the rotary actuators 117 and 118 by the proper signal causes rotation of the fingers 103 and 105 to the appropriate positions. The rotary actuators 117 and 118 are hydraulically actuated; however, for the purpose of the functioning of the herein disclosed device any means might be utilized to rotate the fingers.

An annular declamping ring 120 is carried by the first slide carriage 94 and is capable of moving axially between operative and inoperative positions. The declamping ring 120 shown in FIG. 3 is in its inoperative position and is moved to its operative position by means of three hydraulic cylinders (only one of which is shown) identified by the reference numeral 122. Each of the hydraulic cylinders 122 includes a piston portion which is connected at 123 to the declamping ring and actuation of the hydraulic cylinders causes the declamping ring 120 to move to the right (as seen in FIGS. 2 and 3) thereby engaging the locking ring 49 moving it inwardly against the force of spring means 53.

Figure 4:
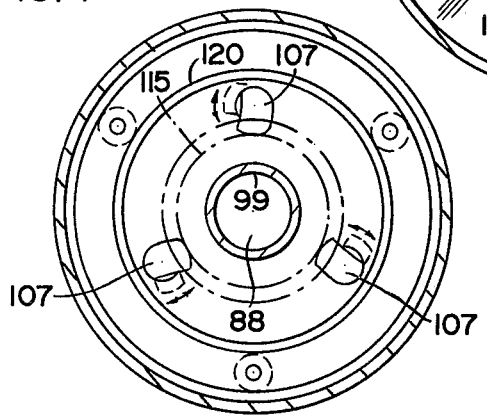
FIG. 4 is a view taken generally along the line 4—4 of FIG. 3.
Figure 5:
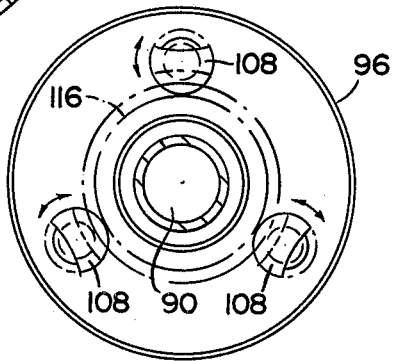
FIG. 5 is a view taken generally along the line 5—5 of FIG. 3.

In operation, the centrifugally cast tire 83 containing the hub assembly 20, tread ring 84 and retaining ring 85 is moved into position between the spaced portions 81 and 82 of the base 79 by means of the carriage 86 which travels on wheels 87 which roll on tracks 89. The carriage is brought into this position with the slide carriages 94 and 96 in their retracted positions so that the tread ring 84 of the tire mold appropriately clears the locator shafts 99 and 101. After the completed tire has been properly positioned the slide carriages 94 and 96 are moved inwardly toward each other to position the locator shafts 99 and 101 within the bore 36 of the hub assembly 20. The position of the pulling fingers 103 and 105 while the slide carriages are being moved inwardly are in their inactive positions or out of alignment with collars 115 and 116 and after the slide carriages have been fully advanced to their most inward positions the pulling fingers are moved to their engaged positions in which they are shown in FIGS. 3, 4 and 5. This is accomplished by actuating the rotary actuators 117 and 118. The next step in the operation is to actuate the hydraulic cylinders 122 moving the declamping ring 120 inwardly or to the right as illustrated in FIG. 3 to engage the locking ring 49 moving it inwardly thereby unlatching the latch members 41 of the hub assembly 20. The slide carriages 94 and 96 are then retracted or moved away from each other and with the locking fingers engaged in the collars 115 and 116 the hub member 32 is moved outwardly to the left and the hub ring 56 is moved outwardly to the right. See dot-dash position of ring 56 in FIG. 2. There is a substantial amount of unbalanced force exerted in the removal of the two hub parts as aforementioned and in order to additionally support the tire tread ring and other associated components a supporting structure 127 is provided which is connected to the base 79 and insures stability of the components during this disassembly.

With the two hub parts removed the hubless tire 82, tread ring 84 and retaining ring 85 are removed from the hub disassembly apparatus 77 in the same manner as they were moved into position. The declamping ring 49 is then released by deactuating the hydraulic cylinders 122 whereupon the spring means 53 move the locking ring 49 to the position shown in FIG. 2 of the drawings. The locking fingers 103 and 105 are then moved to their inactive positions by rotation thereof through means of the rotary actuators 117 and 118. The hub member 32 and hub ring 56 may then be removed from the respective locator shafts on the carriages 94 and 96.

It will therefore be apparent from a review of the abovedetailed description and disclosure that an automatic hub has been disclosed which is capable of conveniently securing the plurality of core sections that make up a core for the centrifugal casting of tires in a convenient and expedient manner which provides for quick disassembly of the core segments and removal from the interior of a centrifugally cast vehicle tire. The hub disassembly apparatus which is disclosed in conjunction with the automatic hub is all part of the structure of facilitating the high production of centrifugally cast vehicle tires in a manner which reduces the unit cost of each tire produced.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A hub assembly for holding a plurality of core segments in assembled relationship and providing for quick disassembly of the core segments including in combination a hub member comprising an annular member having an outer peripheral surface and a bore defining an inner peripheral surface, said hub member having first and second axial end portions, a plurality of circumferentially spaced and pivotally mounted latch members carried by said hub member, each latch member having first and second end portions and being movable between latched and unlatched positions, a plurality of circumferentially spaced pin members extending into said hub member from said first axial end portion therof, a first end portion of said pin members being operatively connected to a first end portion of a respective latch member, a locking ring located at said first axial end portion of said hub member, a second end portion of said pin members being operatively connected to said locking ring, said locking ring being movable between first and second positions to move said latch member between said latched and unlatched positions, spring means acting between said locking ring and said hub member and at all times urging said locking ring to its said first position, a hub ring comprising an annular member having an outer peripheral surface and an inner peripheral surface, said hub ring having first and second axial end portions, wall means defining a bore through said first axial end portion of said hub ring, wall means defining a latch receiving recess means extending into said hub ring from said inner peripheral surface thereof, a first core engaging flange extending generally radially outwardly from said outer peripheral surface of said hub member and adapted to engage one side portion of a plurality of assembled core sections, a second core engaging flange extending generally radially outwardly from said outer peripheral surface of said hub ring and adapted to engage another side portion of a plurality of assembled core sections, said hub ring residing on said hub member with said inner peripheral surface thereof engaging said outer peripheral surface of said hub member and with said second axial end portion of said hub ring engaging said first core engaging flange on said hub member, said second end portions of said latch members residing in said latch receiving recess means of said hub ring in said first position of said locking ring to secure said hub ring on said hub member, said second end portions of said latch members being located out of said latch receiving recess means in said second position of said locking ring thereby permitting removal of said hub ring from said hub member.

2. Hub disassembly apparatus including in combination a base, said base comprising first and second spaced portions, first and second guide rod members respectively mounted on said first and second portions of said base and extending toward each other in axial alignment and terminating short of each other, first and second slide carriages mounted respectively on said first and second guide rod members and each said slide carriage being adapted to move between retracted inoperative positions and forward operative positions, said first and second slide carriages comprising respectively first and second locator shafts which shafts are adapted to enter the bore in a hub assembly to locate the hub assembly both axially and radially, a plurality of pulling fingers carried by each of said first and second slide carriages with each finger being mounted for rotative movement, said pulling fingers on each slide carriage being located at circumferentially spaced locations with respect to the axes of said locator shafts, each said pulling finger having first and second end portions, said first end portion of each of said pulling fingers having a radially extended portion which extends a circumferential distance, sprocket means carried by said second end portion of each of said pulling fingers, a first chain connecting said sprocket means of said pulling fingers on said first slide carriage together whereby said just referred to fingers rotate together, a second chain connecting said sprocket means of said pulling fingers on said second slide carriage together whereby said last referred to fingers rotate together, a declamping ring mounted on said first slide carriage and adapted to move axially with respect to said first slide carriage between operative and inoperative positions to engage and disengage a locking ring on a hub assembly, means for moving said declamping ring between said operative and inoperative positions, and means operatively connected to said base for securing a hub assembly during disassembly of same by said hub disassembly apparatus.

3. Hub disassembly apparatus including in combination first and second opposed guide means, first and second slide carriages mounted respectively by said first and second guide means and movable toward and away from each other between first and second positions, a first plurality of pulling fingers on said first slide carriage, said fingers being movable between operative and inoperative positions, means for moving said first plurality of fingers between said positions, a second plurality of pulling fingers on said second slide carriage, said fingers being movable between operative and inoperative positions, means for moving said second plurality of fingers between said positions, said first plurality of pulling fingers adapted to engage a portion of a hub assembly in their said operative position and said second plurality of pulling fingers adapted to engage another portion of the hub assembly in their said operative position.

4. Hub disassembly apparatus as claimed in claim 3 wherein first and second locator members are respectively carried on said first and second slide carriages and are adapted to enter opposed ends of a bore in a hub assembly in said first positions of said first and second slide carriages to secure and locate the hub assembly.

5. Hub disassembly apparatus as claimed in claim 4 wherein declamping means are carried by said first slide carriage and are movable from an inoperative to an operative position to unlock two parts of a hub assembly.

6. Hub disassembly apparatus as claimed in claim 3 wherein said pulling fingers each have a radially extending portion which engages the hub assembly in said operative position of said fingers.

7. Hub disassembly apparatus as claimed in claim 6 wherein said fingers of each of said first and second plurality of pulling fingers are arranged in a generally circumferential pattern and each finger is mounted for rotation, means are provided for applying a rotative force to at least one of said fingers of each plurality and mechanical means interconnect all of the fingers of a given plurality to cause the fingers of a given plurality to rotate in unison.

8. A hub assembly for securing a plurality of core segments including in combination a hub member having a first core engaging member, a hub ring engaging said hub member and having a second core engaging member spaced from said first core engaging member, latch means carried by one of said hub member and hub ring and movable between latched and unlatched positions, recess means in the other of said hub member and hub ring, said latch means comprising a plurality of circumferentially mounted latch members each having first and second end portions with the second end portions being movable into and out of said recess means, spring means constantly urging said latch means to latched position, said latch means in said latched position being operatively engaged with said recess means and preventing separation of said hub member and hub ring, said latch means in said unlatched position being operatively disengaged from said recess means and permitting separation of said hub member and hub ring, unlocking means carried by said hub member and mechanically connected to said latch members whereby when said unlocking means is moved in one direction said latch members move to unlatched position and when said unlocking means is moved in another direction said latch members move to latched position.

9. A hub assembly as claimed in claim 8 wherein said unlocking means comprises a locking ring carried by said hub member and is connected by pins to said latch members whereby when said locking ring is moved in one direction said latch members move to unlatched position and when said locking ring is moved in another direction said latch members move to latched position.

10. A hub assembly as claimed in claim 8 wherein said hub ring has an outer circumferentially extending surface adapted to engage and support the inner circumferentially extending surface of core segments which segments are adapted to be secured between said first and second core engaging members.

* * * * *